United States Patent
Thangudu et al.

(10) Patent No.: US 9,361,694 B2
(45) Date of Patent: Jun. 7, 2016

(54) SYSTEM AND METHOD FOR DETERMINING ROTATION INVARIANT FEATURE DESCRIPTORS FOR POINTS OF INTEREST IN DIGITAL IMAGES

(71) Applicant: ITTIAM SYSTEMS (P) LTD., Bangalore (IN)

(72) Inventors: Naveen Kumar Thangudu, Bangalore (IN); Shireesh Kadaramandalgi, Bangalore (IN); Preethi Konda, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 0 days.

(21) Appl. No.: 14/459,330

(22) Filed: Aug. 14, 2014

(65) Prior Publication Data

US 2016/0005172 A1     Jan. 7, 2016

(30) Foreign Application Priority Data

Jul. 2, 2014   (IN) .......................... 3272/CHE/2014

(51) Int. Cl.
   *G06T 7/00*   (2006.01)
   *G06K 9/62*   (2006.01)
   *G06K 9/46*   (2006.01)

(52) U.S. Cl.
   CPC ............ *G06T 7/0042* (2013.01); *G06K 9/4671* (2013.01); *G06K 9/6202* (2013.01); *G06T 2207/10004* (2013.01); *G06T 2207/30244* (2013.01)

(58) Field of Classification Search
   USPC ....................... 348/42–60; 382/154
   See application file for complete search history.

(56) References Cited

U.S. PATENT DOCUMENTS

| 6,728,582 | B1 * | 4/2004 | Wallack ........................ 700/64 |
| 6,738,424 | B1 * | 5/2004 | Allmen ................. G06T 9/001 375/240.08 |
| 7,526,131 | B2 * | 4/2009 | Weber ........................... 382/199 |
| 7,706,603 | B2 * | 4/2010 | Najafi et al. .................. 382/154 |
| 7,822,264 | B2 * | 10/2010 | Balslev et al. ................ 382/154 |
| 8,379,929 | B2 * | 2/2013 | Sharp ............................ 382/106 |
| 2005/0031210 | A1 * | 2/2005 | Shen et al. .................... 382/215 |
| 2005/0286767 | A1 * | 12/2005 | Hager et al. .................. 382/190 |
| 2007/0104351 | A1 * | 5/2007 | Yang et al. .................... 382/103 |
| 2007/0127816 | A1 * | 6/2007 | Balslev et al. ................ 382/181 |
| 2012/0207384 | A1 * | 8/2012 | Porikli et al. ................. 382/154 |

* cited by examiner

*Primary Examiner* — Alex Liew
(74) *Attorney, Agent, or Firm* — Prakash Nama; Global IP Services, PLLC

(57) ABSTRACT

A system and method for determining rotation invariant feature descriptors for points of interest in digital images for image matching are disclosed. In one embodiment, a point of interest in each of two or more digital images is identified. Further, the digital images are transformed to change location of the point of interest in each of the digital images to a principal point. Furthermore, a rotation invariant feature descriptor is determined for the point of interest in each of the transformed digital images for image matching.

6 Claims, 6 Drawing Sheets

SYSTEM AND METHOD FOR DETERMINING ROTATION INVARIANT FEATURE DESCRIPTORS FOR POINTS OF INTEREST IN DIGITAL IMAGES

Benefit is claimed under 35 U.S.C. 119(a) to Indian Provisional Patent Application Ser. No 3272/CHE/2014 entitled "SYSTEM AND METHOD FOR DETERMINING ROTATION INVARIANT FEATURE DESCRIPTORS FOR POINTS OF INTEREST IN DIGITAL IMAGES" by ITTIAM SYSTEMS (P) LTD. filed on Jul. 2, 2014.

TECHNICAL FIELD

Embodiments of the present subject matter relate to digital image processing and computer vision. More particularly, embodiments of the present subject matter relate to determination of rotation invariant feature descriptors for points of interest in digital images.

BACKGROUND

Generally, many vision based applications require finding matching points of interest across digital images of a scene or an object captured at different camera positions and/or orientations. The points of interest can be points, sets of points, lines, segments, edges, corners, blobs or regions. The points of interest can also be a group of pixels. For example, in panorama, image registration requires points of interest to be matched across digital images.

Existing approaches extract the points of interest having high repeatability from the digital images. That is, the probability that same sets of points of interest extracted from different digital images is high. Further, the existing approaches form a feature descriptor substantially around each point of interest, based on its neighborhood pixels, to enable comparison and matching of the points of interest. Typically, a feature descriptor requires ensuring that same point of interest in different digital images is described in a similar way with respect to a similarity measure, which may include distinctiveness, i.e., different points of interest result in different feature descriptors and also require invariance to changes in viewing direction, rotation, changes in illumination and/or image noise.

However, the existing approaches assume that all digital images are captured in an upright camera orientation and therefore, may not address the problems associated with changes in orientation. Consequently, this may result in higher probability of mismatches. Further, using the feature descriptor determined by the existing approaches may lead to higher mismatches when digital images contain multiple congruent or near-congruent points of interest, for example, four corners of a symmetric window or individual dartboard sections.

BRIEF DESCRIPTION OF THE DRAWINGS

Various embodiments are described herein with reference to the drawings, wherein.

The systems and methods disclosed herein may be implemented in any means for achieving various aspects. Other features will be apparent from the accompanying drawings and from the detailed description that follow.

DETAILED DESCRIPTION

In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Embodiments described herein provide methods, techniques, and systems for determining rotation invariant feature descriptors for points of interest in digital images. For example, the digital images are images of a scene or an object captured at different orientations and/or view angles. The proposed technique extracts points of interest in each digital image. Further, each digital image corresponding to each point of interest is transformed to change location of the point of interest to a principal point. The principal point is a point where a principal axis meets an image plane. Furthermore, an in-plane rotation invariant feature descriptor is determined for each point of interest in each of the transformed digital images for image matching.

Figure 1:
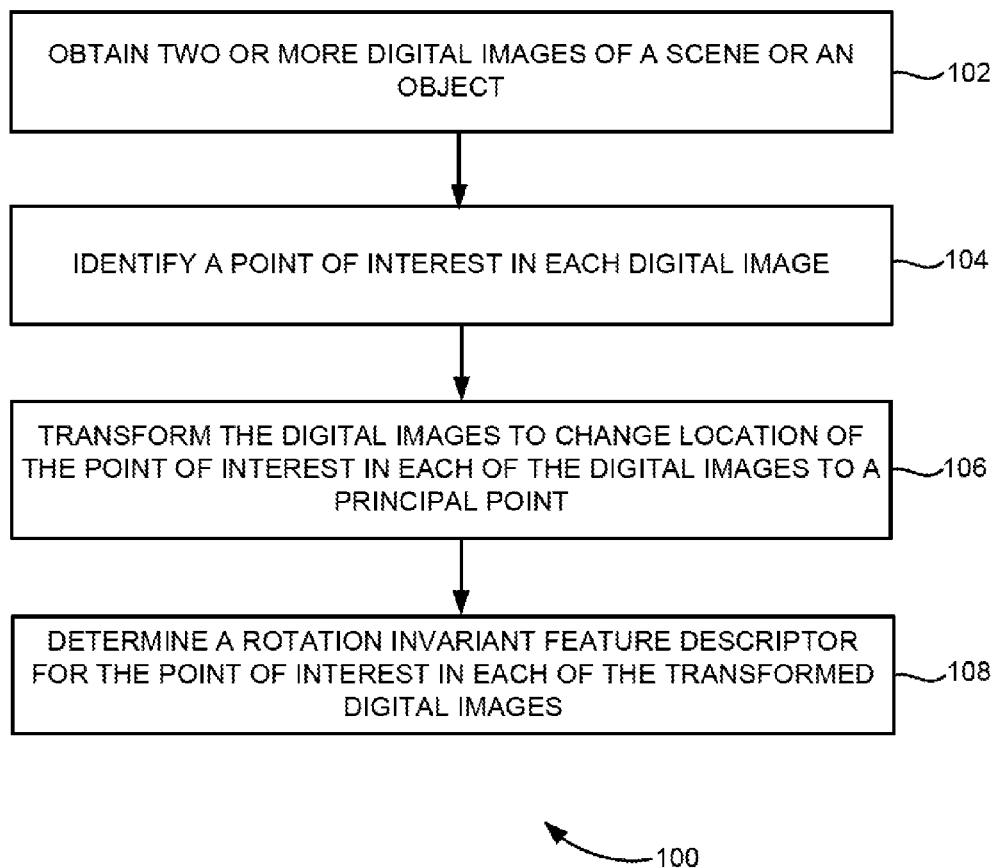
FIG. 1 illustrates a flowchart of a method for determining rotation invariant feature descriptors for points of interest in digital images, according to one embodiment.

FIG. 1 illustrates a flowchart 100 of a method for determining rotation invariant feature descriptors for points of interest in digital images, according to one embodiment. At block 102, two or more digital images of a scene or an object are obtained. For example, the digital images are captured at different orientations and/or view angles keeping camera center fixed. At block 104, a point of interest in each digital image is identified. For example, the point of interest includes points, sets of points, lines, segments, regions, edges, corners, blobs and the like.

At block 106, the digital images are transformed to change location of the point of interest in each digital image to a principal point. In other words, the points of interest in the digital images are transformed from an associated image plane to a common hypothetical image plane. The hypothetical image plane is an image plane formed in such a way that a line between the camera center and an object point (i.e., an original point in the scene or the object) is the optical axis of a camera. For example, a point of interest in different image planes is shown with reference to FIG. 2.

In one example implementation, pan and tilt angles to be applied for the point of interest in each digital image to change the location of the point of interest to the principal point are determined. Further, the digital images are transformed using the associated pan and tilt angles. In other words, the points of interest in the digital images transform to the principal point when the pan and tilt angles are applied. In one example, the pan angle is applied around a point of interest or on a digital image and then the tilt angle is applied around the point of interest or on the digital image. In this example, transformation of the digital image using the pan and tilt angles can be written using an equation:

$$\begin{bmatrix} 0 \\ 0 \\ 1 \end{bmatrix} = K * R_t * R_p * K^{-1} \begin{bmatrix} x \\ y \\ 1 \end{bmatrix}$$

wherein, (x, y, 1) are co-ordinates of the point of interest with respect to an image plane, (0, 0, 1) are co-ordinates of the principal point with respect to the hypothetical image plane, $R_p$ is a rotation matrix for pan, $R_t$ is a rotation matrix for tilt and K is a camera intrinsic matrix which is equal to $$\begin{bmatrix} f_x & 0 & 0 \\ 0 & f_y & 0 \\ 0 & 0 & 1 \end{bmatrix}.$$

The $f_x$ and $f_y$ are focal lengths expressed in pixel units.

In another example, the tilt angle is applied around the point of interest or on the digital image and then the pan angle is applied around the point of interest or on the digital image. In this example, transformation of the digital image using the pan and tilt angles can be written using an equation:

$$\begin{bmatrix} 0 \\ 0 \\ 1 \end{bmatrix} = K * R_p * R_t * K^{-1} \begin{bmatrix} x \\ y \\ 1 \end{bmatrix}$$

At block 108, a rotation invariant feature descriptor is determined for the point of interest in each transformed digital image for image matching. For example, a rotation invariant feature descriptor is determined by forming a window of a predetermined size substantially around a point of interest. In one example implementation, an in-plane rotation invariant feature descriptor is determined for the point of interest in each transformed digital image. This feature descriptor is referred to as all rotation invariant feature descriptor. The all rotation invariant feature descriptors are feature descriptors formed around the points of interest which are pan, tilt and roll invariant.

Figure 2:
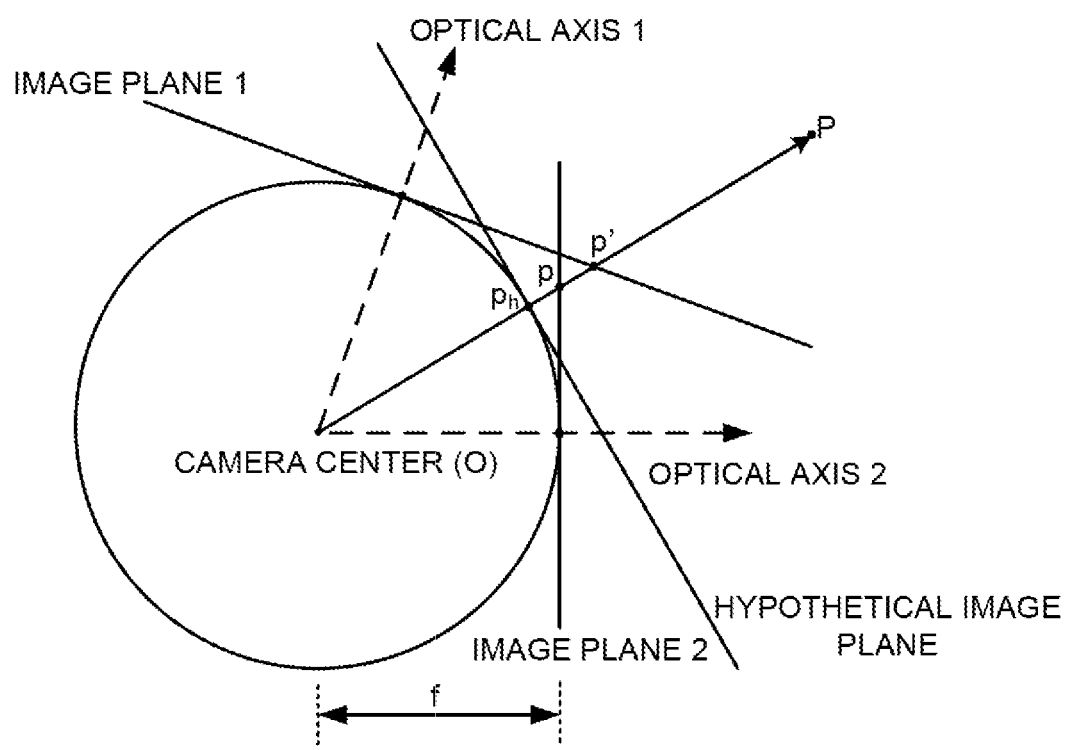
FIG. 2 is a schematic diagram showing a point of interest in different image planes, in the context of the present invention.

Referring now to FIG. 2, which is a schematic diagram 200 showing a point of interest in different image planes, in the context of the present invention. As shown in FIG. 2, an object point P is projected on two image planes (i.e., an image plane 1 and image plane 2) of different orientations, but with same camera centre (O), at points p and p'. In other words, two images, an image1 and image2, are taken from same camera at different orientations and the points p and p' are points of interest in the image1 and image2, respectively, which belong to same point (i.e., the object point P) in a scene. Co-ordinates of the points p and p' are (x, y, 1) and (x', y', 1), respectively. The co-ordinates of the points p and p' are represented with a principal point as an origin in their respective image planes. Further as shown in FIG. 2, $p_h$ is an image of the object point P on a hypothetical image plane, where an orientation of the camera is such that a line OP is an optical axis of the camera.

Figure 3A:
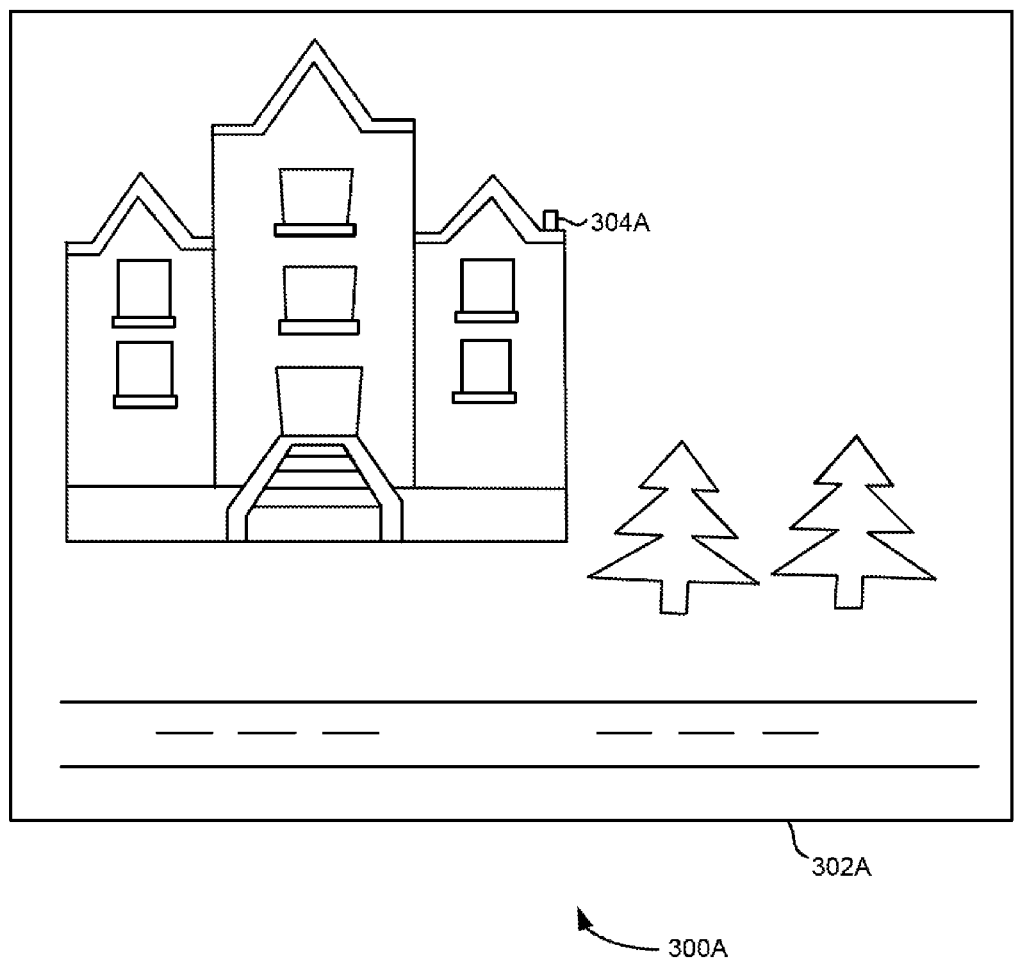
FIGS. 3A-3C are schematic diagrams illustrating transforming digital images to a common hypothetical image plane such that rotation invariant feature descriptors of points of interest can be matched, according to one embodiment.
Figure 3B:
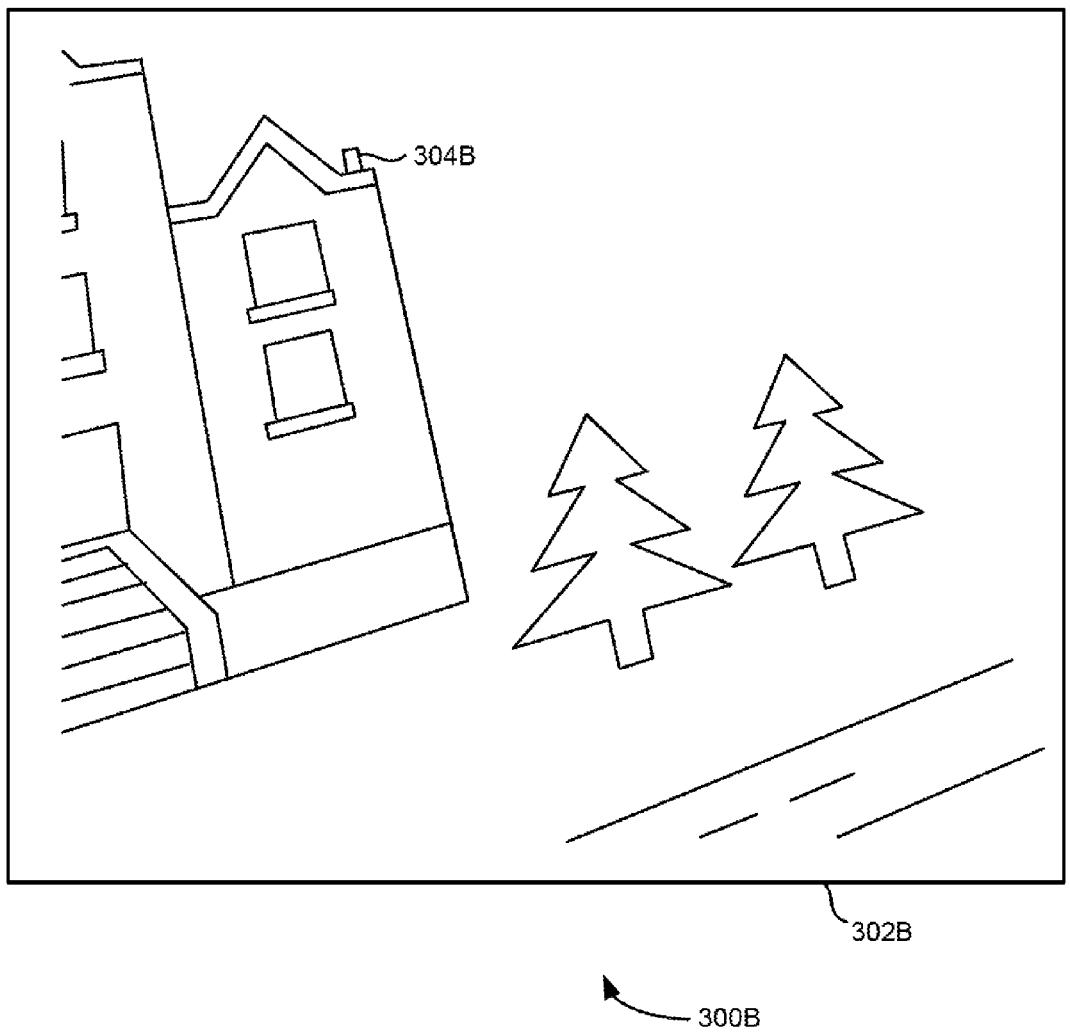
Figure 3C:
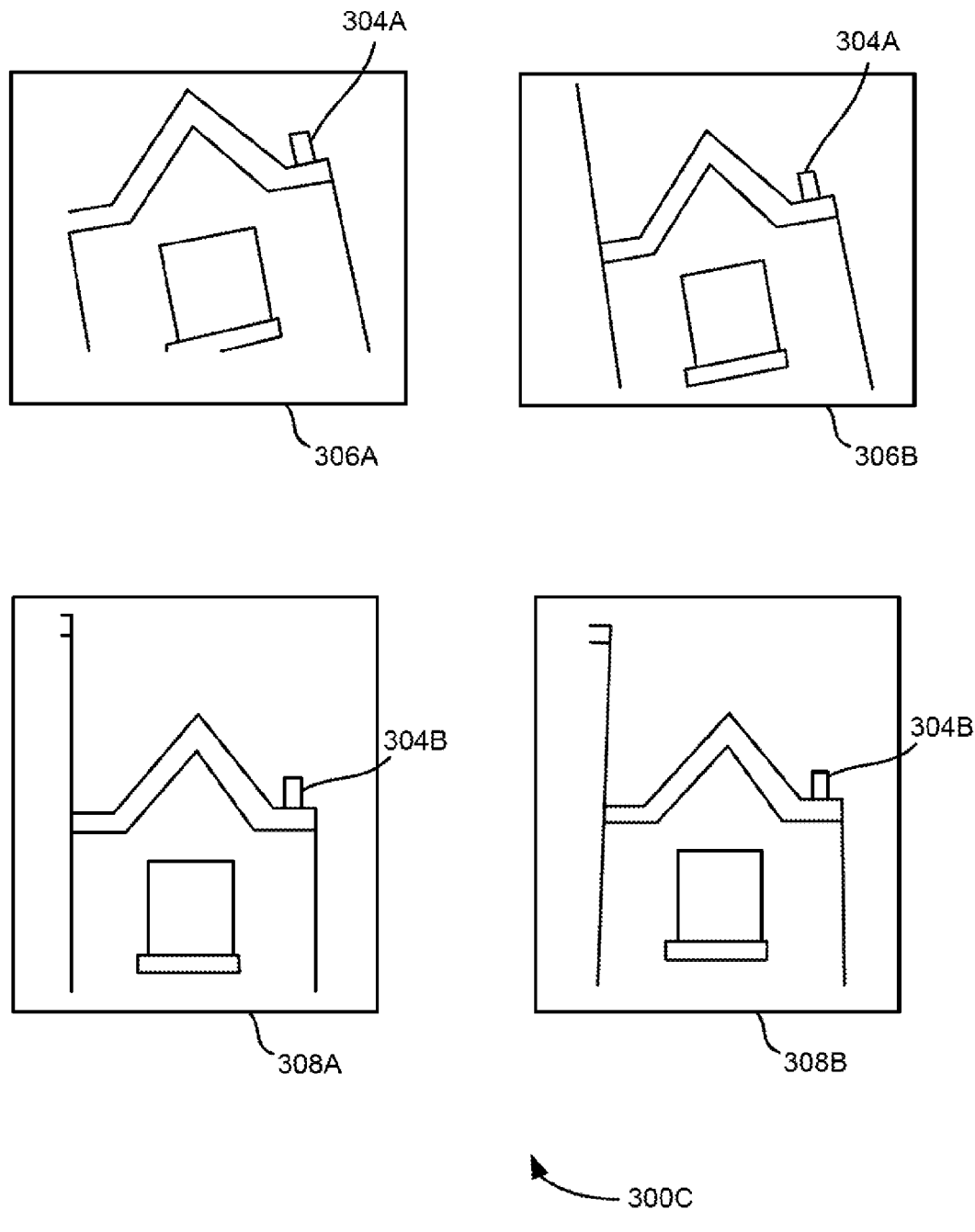

Referring now to FIGS. 3A-3C, which are schematic diagrams 300A-300C illustrating transforming digital images to a common hypothetical image plane such that rotation invariant feature descriptors of points of interest can be matched, according to one embodiment. As shown in FIGS. 3A and 3B, digital images 302A and 302B are images of a scene or an object captured using a camera with substantially same camera center. Particularly, the digital image 302A is the image of the scene captured when an image plane of the camera is parallel to that of an image plane of the scene. The digital image 302B is the image of the scene captured when the camera is rotated by 15 degrees in all directions (pan, tilt and roll) with respect to 302A.

Further, points of interest 304A and 304B are identified in the digital images 302A and 302B, respectively. Furthermore, the digital images 302A and 302B are transformed to change location of the points of interest 304A and 304B, respectively, to a principal point. In addition, a rotation invariant feature descriptor is determined for each of the points of interest 304A and 304B. In the example illustrated in FIG. 3C, feature descriptors 306A and 306B are feature descriptors of the point of interest 304A before and after performing the transformation. Similarly, feature descriptors 308A and 308B are feature descriptors of the point of interest 304B before and after performing the transformation. As shown in the FIG. 3C, the rotation invariant feature descriptors 306B and 308B are pan and tilt invariant and are bound to be related with an in-plane rotation. Even though it is explained with reference to one point of interest in each digital image, one can envision that the present technique can be applicable to multiple points of interest in each digital image for image matching.

Figure 4:
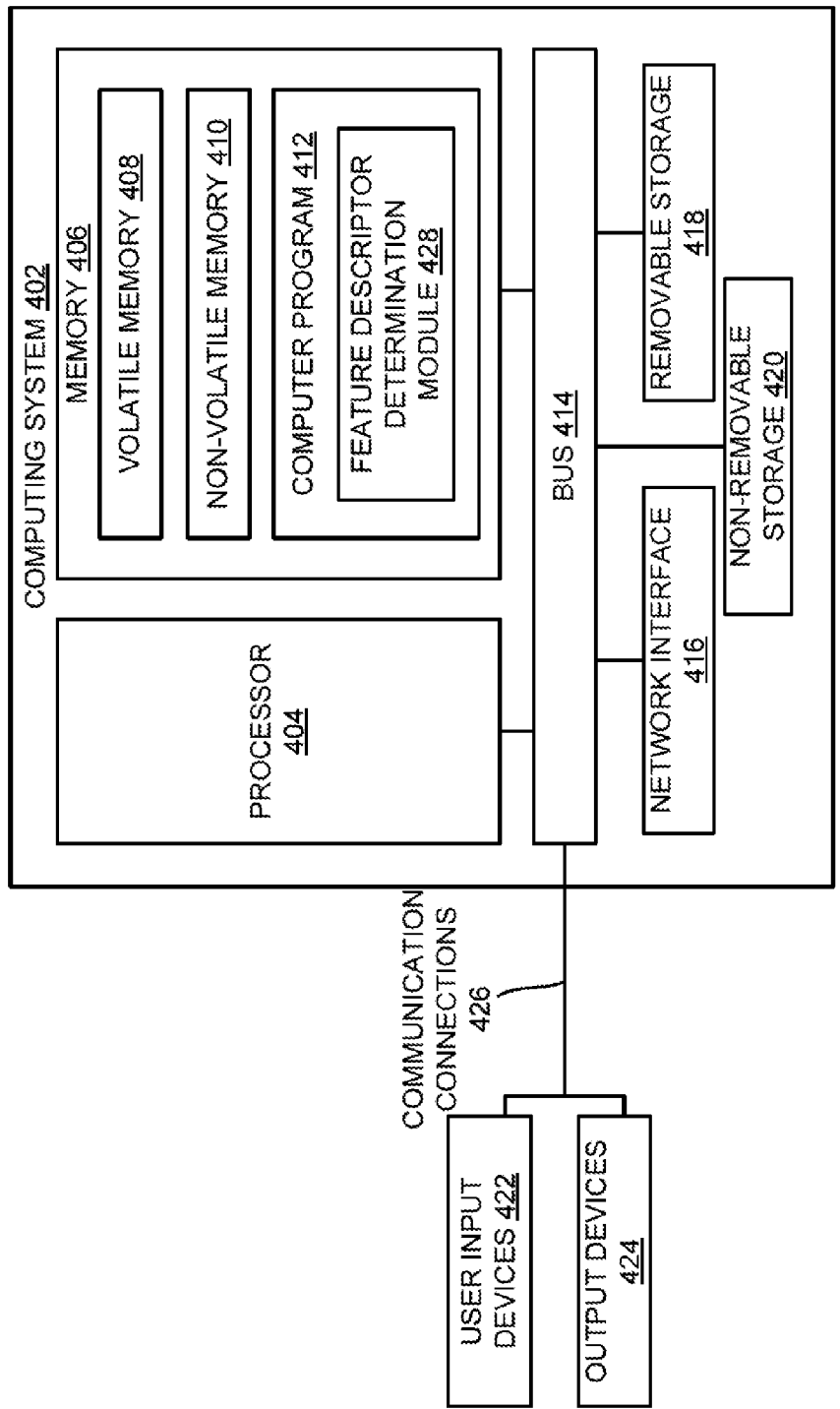
FIG. 4 illustrates a block diagram of a computing system for determining rotation invariant feature descriptors for points of interest in digital images, using the process described in FIG. 1, according to one embodiment.

Referring now to FIG. 4, which illustrates a computing system 402 for determining rotation invariant feature descriptors for points of interest in digital images, using the process described in FIG. 1, according to one embodiment. FIG. 4 and the following discussions are intended to provide a brief, general description of a suitable computing environment in which certain embodiments of the inventive concepts contained herein are implemented.

The computing system 402 includes a processor 404, memory 406, a removable storage 418, and a non-removable storage 420. The computing system 402 additionally includes a bus 414 and a network interface 416. As shown in FIG. 4, the computing system 402 includes access to the computing system environment 400 that includes one or more user input devices 422, one or more output devices 424, and one or more communication connections 426 such as a network interface card and/or a universal serial bus connection.

Exemplary user input devices 422 include a digitizer screen, a stylus, a trackball, a keyboard, a keypad, a mouse and the like. Exemplary output devices 424 include a display unit of the personal computer, a mobile device, and the like. Exemplary communication connections 426 include a local area network, a wide area network, and/or other network.

The memory 406 further includes volatile memory 408 and non-volatile memory 410. A variety of computer-readable storage media are stored in and accessed from the memory elements of the computing system 402, such as the volatile memory 408 and the non-volatile memory 410, the removable storage 418 and the non-removable storage 420. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 404, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 404 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 404 of the computing system 402. For example, a computer program 412 includes machine-readable instructions capable for determining the rotation invariant feature descriptors for the points of interest in the digital images, according to the teachings and herein described embodiments of the present subject matter. In one embodiment, the computer program 412 is included on a compact disk-read only memory (CD-ROM) and loaded from the CD-ROM to a hard drive in the non-volatile memory 410. The machine-readable instructions cause the computing system 402 to encode according to the various embodiments of the present subject matter.

As shown, the computer program 412 includes a feature descriptor determination module 428. For example, the feature descriptor determination module 428 can be in the form of instructions stored on a non-transitory computer-readable storage medium. The non-transitory computer-readable storage medium having the instructions that, when executed by the computing system 402, causes the computing system 402 to perform the method described in FIG. 1.

In one embodiment, the feature descriptor determination module 428 obtains two or more digital images of a scene or an object captured at different orientations and/or view angles. Further, the feature descriptor determination module 428 identifies a point of interest in each digital image. Furthermore, the feature descriptor determination module 428 transforms the digital images to change location of the point of interest in each of the digital images to a principal point. Also, the feature descriptor determination module 428 determines a rotation invariant feature descriptor for the point of interest in each transformed digital image for image matching. This is explained in more detailed with reference to FIG. 1.

In various embodiments, the systems and methods described in FIGS. 1 through 4 propose a technique for determining rotation invariant feature descriptors for points of interest in digital images captured at different orientations and/or view angles. Particularly, the proposed technique transforms the digital images and then determines the rotation invariant feature descriptors for the points of interest in the transformed digital images. In the transformed digital images, location of the point of interest is at a principal point. Therefore, using the determined rotation invariant feature descriptors for image matching increases probability of matches.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for determining rotation invariant feature descriptors for points of interest in digital images for image matching, comprising:
obtaining at least two digital images captured at different orientations and/or view angles with a same camera center;
identifying a point of interest in each of the at least two digital images;
transforming the at least two digital images to change location of the point of interest in each of the at least two digital images to a principal point, comprising:
determining pan and tilt angles to be applied for the point of interest in each of the at least two digital images to change the location of the point of interest to the principal point and transforming the at least two digital images using the associated pan and tilt angles, using an equation:

$$\begin{bmatrix} 0 \\ 0 \\ 1 \end{bmatrix} = K * R_p * R_t * K^{-1} \begin{bmatrix} x \\ y \\ 1 \end{bmatrix}, \text{ or}$$

$$\begin{bmatrix} 0 \\ 0 \\ 1 \end{bmatrix} = K * R_t * R_p * K^{-1} \begin{bmatrix} x \\ y \\ 1 \end{bmatrix},$$

wherein, (x, y, 1) are co-ordinates of the point of interest with respect to an image plane, (0, 0, 1) are co-ordinates of the principal point with respect to a hypothetical image plane, K is a camera intrinsic matrix, $R_p$, is a rotation matrix for pan and $R_t$ is a rotation matrix for tilt; and
determining a rotation invariant feature descriptor for the point of interest in each of the at least two transformed digital images for image matching.

2. The method of claim 1, wherein the point of interest is selected from the group consisting of sets of points, lines, segments, regions, edges, corners and blobs.

3. A system, comprising:
a processor; and
a memory coupled to the processor, wherein the memory comprises a feature descriptor determination module to:
obtain at least two digital images captured at different orientations and/or view angles with a same camera center;
identify a point of interest in each of the at least two digital images;
transform the at least two digital images to change location of the point of interest in each of the at least two digital images to a principal point by:
determining pan and tilt angles to be applied for the point of interest in each of the at least two digital images to change the location of the point of interest to the principal point and transforming the at least two digital images using the associated pan and tilt angles, using an equation:

$$\begin{bmatrix} 0 \\ 0 \\ 1 \end{bmatrix} = K * R_p * R_t * K^{-1} \begin{bmatrix} x \\ y \\ 1 \end{bmatrix}, \text{ or}$$

$$\begin{bmatrix} 0 \\ 0 \\ 1 \end{bmatrix} = K * R_t * R_p * K^{-1} \begin{bmatrix} x \\ y \\ 1 \end{bmatrix},$$

wherein, (x, y, 1) are co-ordinates of the point of interest with respect to an image plane, (0, 0, 1) are co-ordinates of the principal point with respect to a hypothetical image plane, K is a camera intrinsic matrix, $R_p$ is a rotation matrix for pan and $R_t$ is a rotation matrix for tilt; and determine a rotation invariant feature descriptor for the point of interest in each of the at least two transformed digital images for image matching.

4. The system of claim 3, wherein the point of interest is selected from the group consisting of sets of points, lines, segments, regions, edges, corners and blobs.

5. A non-transitory computer-readable storage medium including instructions executable by a computing device to:
obtain at least two digital images captured at different orientations and/or view angles with a same camera center;
identify a point of interest in each of the at least two digital images;
transform the at least two digital images to change location of the point of interest in each of the at least two digital images to a principal point by:
determining pan and tilt angles to be applied for the point of interest in each of the at least two digital images to change the location of the point of interest to the principal point and transforming the at least two digital images using the associated pan and tilt angles, using an equation:

$$\begin{bmatrix} 0 \\ 0 \\ 1 \end{bmatrix} = K * R_p * R_t * K^{-1} \begin{bmatrix} x \\ y \\ 1 \end{bmatrix}, \text{ or}$$

$$\begin{bmatrix} 0 \\ 0 \\ 1 \end{bmatrix} = K * R_t * R_p * K^{-1} \begin{bmatrix} x \\ y \\ 1 \end{bmatrix},$$

wherein, (x, y, 1) are co-ordinates of the point of interest with respect to an image plane, (0, 0, 1) are co-ordinates of the principal point with respect to a hypothetical image plane, K is a camera intrinsic matrix, $R_p$, is a rotation matrix for pan and $R_t$ is a rotation matrix for tilt; and determine a rotation invariant feature descriptor for the point of interest in each of the at least two transformed digital images for image matching.

6. The non-transitory computer-readable storage medium of claim 5, wherein the point of interest is selected from the group consisting of sets of points, lines, segments, regions, edges, corners and blobs.

* * * * *